United States Patent [19]

Wilde

[11] Patent Number: 5,347,573
[45] Date of Patent: Sep. 13, 1994

[54] METHOD FOR INFLUENCING A SIGNALLING PROCEDURE IMPLEMENTED IN A COMMUNICATION TERMINAL EQUIPMENT

[75] Inventor: Wolfgang Wilde, Munich, Fed. Rep. of Germany

[73] Assignee: Siemens Aktiengesellschaft, Munich, Fed. Rep. of Germany

[21] Appl. No.: 897,087

[22] Filed: Jun. 11, 1992

[30] Foreign Application Priority Data

Jun. 13, 1991 [EP] European Pat. Off. ........ 91109744.2

[51] Int. Cl.$^5$ ............................................. H04M 3/42
[52] U.S. Cl. ..................................... 379/201; 379/396
[58] Field of Search ................. 379/94, 201, 216, 265, 379/267, 350, 352, 396, 210, 211, 212

[56] References Cited

U.S. PATENT DOCUMENTS

| | | |
|---|---|---|
| 4,659,876 | 4/1987 | Sullivan . |
| 4,747,127 | 5/1988 | Hansen et al. ...................... 379/201 |
| 4,788,720 | 11/1988 | Brennan et al. ...................... 379/201 |
| 4,823,374 | 4/1989 | Verlohr . |
| 4,897,866 | 1/1990 | Majmudar et al. . |

FOREIGN PATENT DOCUMENTS

| | | |
|---|---|---|
| 0173264 | 3/1986 | European Pat. Off. . |
| 0419948 | 4/1991 | European Pat. Off. . |
| 3112475 | 2/1983 | Fed. Rep. of Germany . |
| 3506910 | 1/1986 | Fed. Rep. of Germany . |
| 59-134953 | 12/1984 | Japan . |
| 1229551 | 12/1989 | Japan . |

OTHER PUBLICATIONS

"An Interactive Touch Phone for Office Automation", Hsing et al. IEEE Communications Magazine, vol. 23 No. 2 pp. 21–26.
"Touchphone: A New Generation in Telephone Design", Bloeden et al. Telesis 1985 Two, pp. 21–25.

Primary Examiner—James L. Dwyer
Assistant Examiner—Daniel S. Hunter
Attorney, Agent, or Firm—Hill, Steadman & Simpson

[57] ABSTRACT

A method for controlling a signalling procedure in communication terminal equipment such that initialization and control of the signalling procedure or of subscriber performance features is achieved with a minimum of additional, special keys. First procedure control information that defines a signalling sub-procedure is formed after every activation of the communication terminal equipment and before every branching of the signalling procedure into a plurality of signalling sub-procedures. Procedure control information is communicated to a display device for the purpose of visualization of at least one procedure control information. Upon actuation of a sequence key in the communication terminal equipment, further procedure control information defining a further signalling sub-procedure is formed and is communicated to the display device. After actuation of an actuation key in the communication terminal equipment, a signalling sub-procedure respectively defined by procedure control information most recently supplied to the display device is selected and executed.

18 Claims, 4 Drawing Sheets

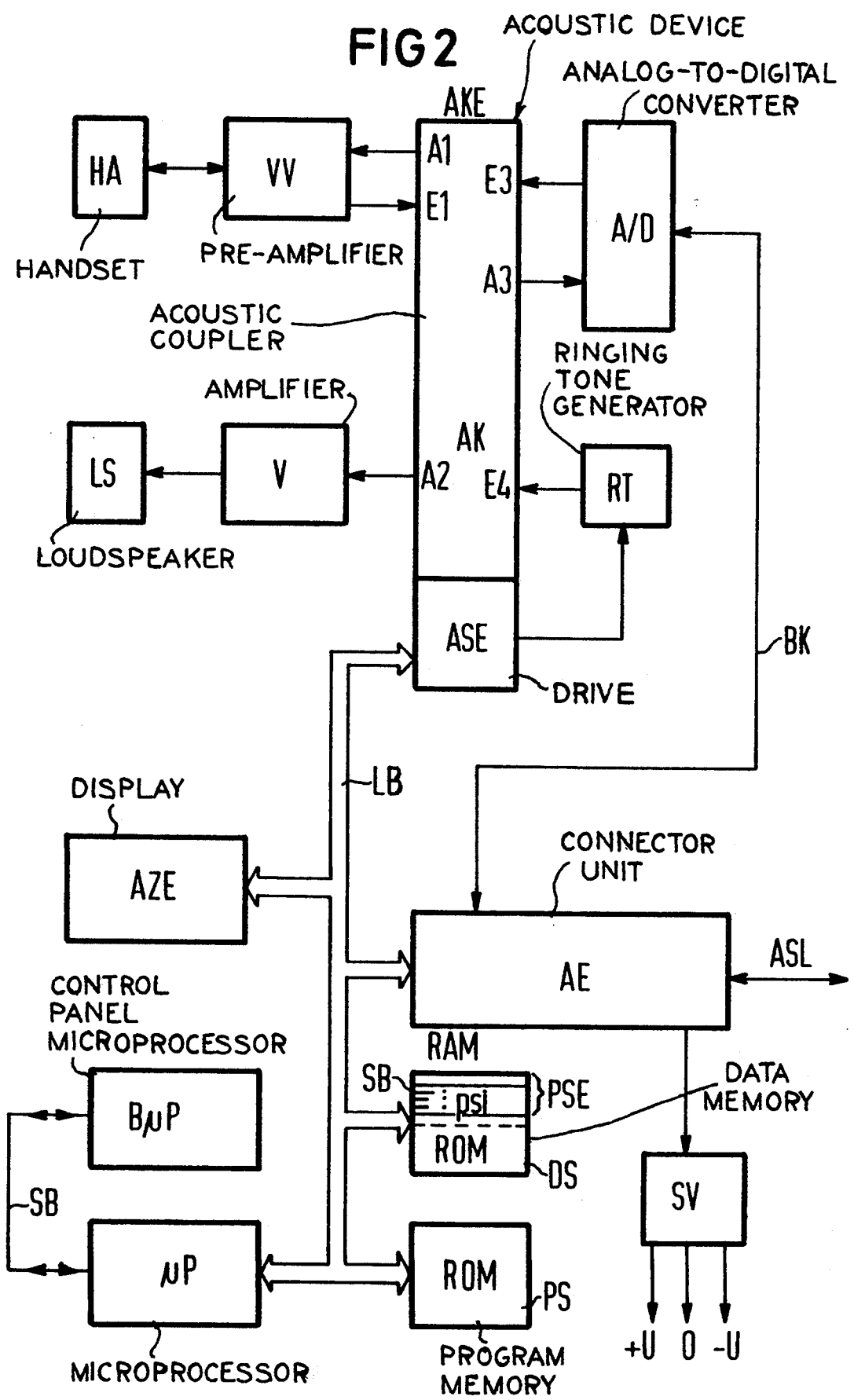

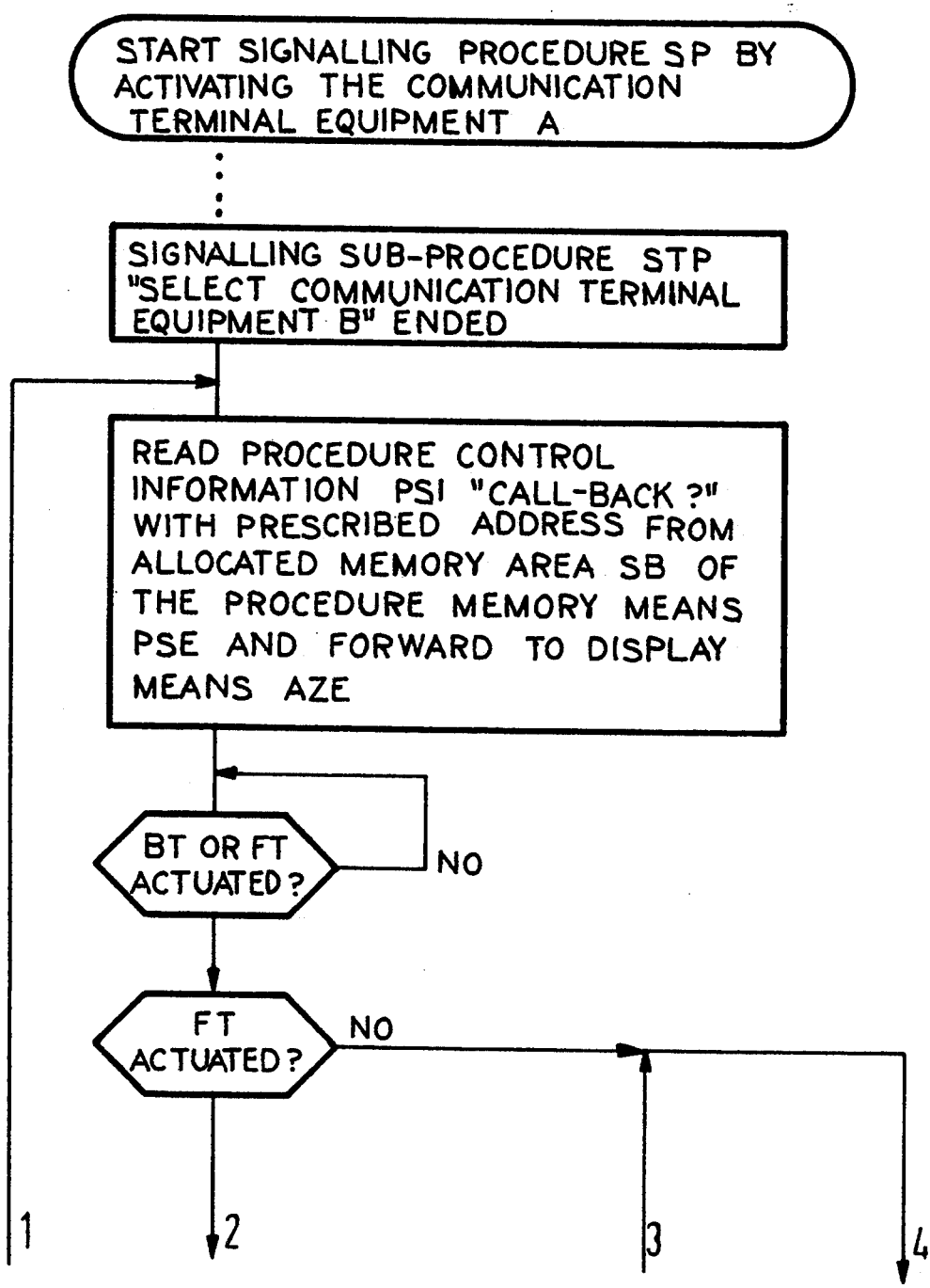

METHOD FOR INFLUENCING A SIGNALLING PROCEDURE IMPLEMENTED IN A COMMUNICATION TERMINAL EQUIPMENT

BACKGROUND OF THE INVENTION

The call setup and cleardown between a communications system and communication terminal equipment, as well as, subscriber performance features, for example, call rerouting, are controlled in communication terminal equipment using a signalling procedure. As used herein the term "cleardown" refers to clearing a call, that is taking a call off line and releasing the central office. The signalling procedure that is usually realized in program-oriented terms is controlled by key actuations in the framework of the call setup or cleardown or during the communication phase, whereby the controlling occurs before every branching within the signalling procedure. A plurality of subscriber performance features are offered with an increasing tendency, particularly in private communication networks. A plurality of special keys are provided for the control of the subscriber performance features in the associated communication terminal equipment in addition to the numerical keyboard. Such communication terminal equipment is known from the product publication "ISDN im Buero" of Siemens AG, reprint of "Telcom Report" and from Siemens-Magazin COM, page 42. Furthermore, numerous arrangements or implementations of the special keys are known for the initialization and control of the subscriber performance features. In one of these versions, keys are multiply occupied in order to save keys and, thus, costs, i.e. the individual keys have a plurality of control possibilities allocated to them, whereby the switching for all or in groups is effected by further special keys.

Further, U.S. Pat. No. 4,659,876 discloses an "audiographic communication system", whereby the subscriber performance features are initialized by touching a touch-sensitive layer of a picture screen means, what are referred to as "touch screen" keys. In all of such communication terminal equipment, a plurality of additional, special keys that are to be actuated as a function of different operating and signalling statuses of the communication terminal equipment are required for a plurality of implemented subscriber performance features. This is particularly the case in private communications networks. This type of actuation assumes extensive knowledge, particularly in view of the signalling statuses and of the possible actuation versions. As a result of this required extensive knowledge, subscriber acceptance of such communication terminal equipment is considerably reduced and use is not made of the subscriber performance features that are offered.

SUMMARY OF THE INVENTION

It is an object of the present invention to provide communication terminal equipment such that the initialization and control of the signalling procedure or of the subscriber performance features is achieved with a minimum of additional, special keys.

This object is achieved by the method of the present invention for influencing a signalling procedure implemented in communication terminal equipment, whereby a call setup or cleardown between the communication terminal equipment and a communications system connected thereto, as well as, performance feature controls within the framework of the call setup and cleardown and during a communication phase are controlled by the signalling procedure realized in program-oriented terms and controllable by key actuations. In the method first procedure control information that defines a signalling sub-procedure is formed after every activation of the communication terminal equipment connected to a communications system and before every branching of the signalling procedure into a plurality of signalling sub-procedures. The procedure control information is communicated to a display means for the purpose of a visualization of at least one procedure control information. Upon actuation of a sequence key in the communication terminal equipment, a procedure control information defining a further signalling sub-procedure is formed and is communicated to the display means. After actuation of an actuation key in the communication terminal equipment, the signalling sub-procedure defined by the procedure control information most recently supplied to the display means is selected and executed.

An important aspect of the method of the present invention is that a first procedure control information that defines a signalling sub-procedure is formed and communicated to the display means before every branching of the signalling procedure into a plurality of signalling sub-procedures. Further, two keys, a sequence key and an actuation key, are provided in the communication terminal equipment. When an actuation of the sequence key occurs after the communication of the first procedure control information to the display means, then a procedure control information that defines a further signalling sub-procedure is formed and is communicated to the display means. When, by contrast, the actuation key is actuated, then the signalling sub-procedure defined by the procedure control information most recently supplied to the display means is selected and executed.

An important advantage of the method of the present invention is that only two special keys, the sequence key and the actuation key, are required for the control of an arbitrary plurality of subscriber performance features in addition to the numerical keyboard. Another important advantage of the method of the present invention is that no knowledge is required regarding the sequence of the key actuations.

According to an advantageous development of the method of the present invention, the first procedure control information and the sequence of the further procedure control information are formed as a function of the frequency with which the signalling sub-procedures are used. This means that procedure control information whose allocated signalling sub-procedures are frequently defined by the actuation key are respectively formed as first procedure control information and are supplied to the display means. After actuation of the sequence key, that procedure control information whose allocated signalling sub-procedure is selected with the second greatest frequency is formed. Given further actuations of the sequence key, the procedure control information, as set forth above, is formed in accord with the further frequency of the signalling sub-procedures that are used.

According to other, advantageous developments of the method of the present invention, the procedure control information is either directly inserted into the signalling procedure as program elements, as a result whereof the frequency of use is permanently prescribed, or is deposited in a procedure memory means allocated to the signalling procedure. Given a storing of the procedure control information in a procedure memory means, memory addresses, by means of which the addressed memory areas are respectively read and the procedure control information that is read is communicated to the display means, are indicated before every branching in the signalling procedure. The procedure control information can be written into or read from the procedure memory means by means of a memory access procedure. Quite advantageously, the procedure control information (for example, during an initialization of the communication terminal equipment or during operation in order, for example, to display the procedure control information in a different national language) is transmitted from the communications system to the communication terminal equipment with a transmission procedure and is deposited in the prescribed memory areas of the procedure memory means ("downloading" of procedure control information).

According to another advantageous development of the method of the present invention, groups of procedure control information representing different frequencies of use can be stored in the communications system. Upon initialization of the communication terminal equipment, a prescribed group of procedure control information is thereby communicated thereto as what is referred to as "standard" group. Another group or, respectively, a group of procedure control information representing another frequency of use can be selected on the basis of a corresponding signalling from the communication terminal equipment, initialized by the subscriber. The selected group of procedure control information is likewise transmitted to the communication terminal equipment with the transmission procedure and is stored in the prescribed memory areas of the procedure memory means.

According to another advantageous development of the method of the present invention, the different groups of procedure control information can be stored in different, prescribed memory areas of the communication terminal equipment. The selection of the groups again occurs on the basis of a corresponding signalling, initialized by the subscriber, at the communication terminal equipment. The different memory areas of the procedure memory means are thereby selected by different calculations of the memory addresses, whereby the different calculations are set by the signalling.

An additional, advantageous development of the method of the present invention is in forming the first and at least one further procedure control information before every branching of the signalling procedure into a plurality of signalling sub-procedures and to communicate the first and at least one further procedure control information to a display means fashioned for the visualization of at least the first and a further procedure control information. The procedure control information is displayed in the display means, for example line-by-line or column-by-column. In order to enhance a subscriber's understanding of the procedure control information, the procedure control information can be converted into user-intelligible, for example intelligible text information or different voice information (for example, into different national languages) before it is communicated to the display means.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 2 is a block circuit diagram of the main circuit components of a communication terminal equipment; and FIGS. 3a and 3b are flow charts of a section of the signalling procedure.

DESCRIPTION OF THE PREFERRED EMBODIMENT

Figure 1:
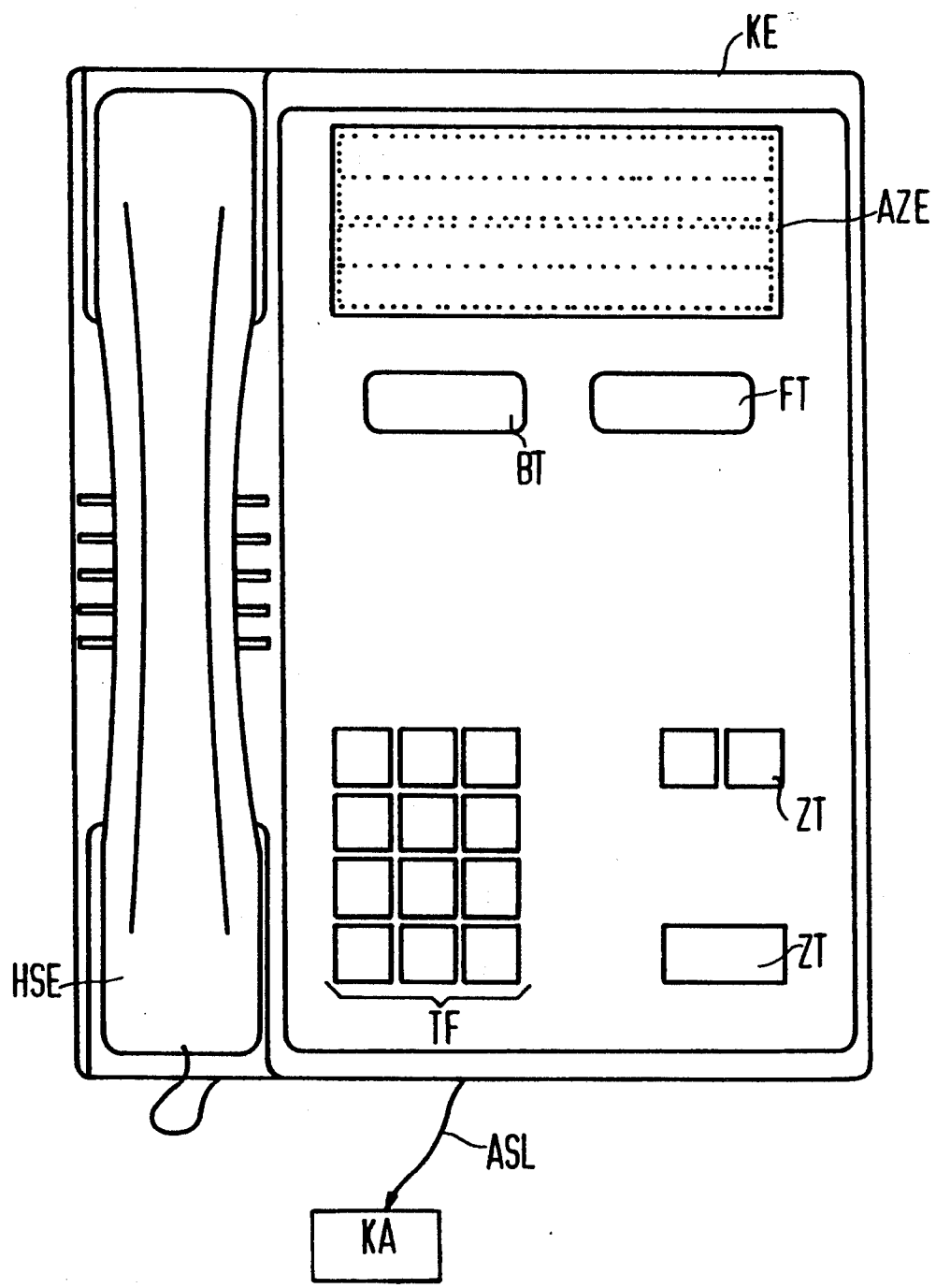
FIG. 1 depicts the user surface of a communications terminal equipment.

FIG. 1 shows a communication terminal equipment KE having an audio-active means HSE that is hung up. A display means AZE is provided for displaying selection information, time of day information, texts and procedure control information. For example, this display means AZE is realized by an LCD display (four lines with 24 characters each). The information relevant to the communications system such as selection information, time of day information, etc., is thereby displayed, for example, in the first two display lines and the procedure control information is displayed in the second two display lines. Further, a key field TF is provided for inputting numerical information, for example dial information. This key field TF contains the numerical keys that are not shown in detail. Further, additional keys ZT are provided by means of which, for example, a built-in loudspeaker can be activated or the volume thereof is controlled or the contrast of the display means AZE can be set. Further, an actuation key BT and a sequence key FT are provided. The communication terminal equipment KE is connected to a communications system KA via a subscriber line ASL.

FIG. 2 shows a hardware block circuit diagram of a communication terminal equipment KE. The central means for controlling the signalling procedure both internally as well as with the communications system KA is realized by a microprocessor system $\mu P$. For example, this microprocessor system $\mu P$ can be formed by a Siemens microprocessor SAB80C31. The microprocessor system $\mu P$ is connected to a program memory PS and to a data memory DS via a local bu LB formed by control, address and data lines. The program memory PS realized in ROM memory technology is designed, for example, for a program covering a maximum of 64 k bytes. One half o the data memory that likewise covers, for example, 64 k bytes can contain a read-only memory executed in ROM memory technology for static data, parameters, data and tables and the other half thereof can contain a memory executed in RAM memory technology, for example for storing procedure control information PSI. A separate memory area SB is thereby provided for every procedure control information PSI, whereby the size of the memory area in the exemplary embodiment is matched to a scope of information that corresponds to a two-line display in the display means AZE. The memory areas SB represent memory sub-areas of a procedure memory means PSE. The microprocessor system $\mu P$ additionally has a serial bus interface. This serial bus interface is connected to a control panel microprocessor system BμP via a serial bus SB. The coded information generated by the keys in the communication terminal equipment KE recognized in the control panel microprocessor system BμP, is serially transmitted to the microprocessor system μP via the serial bus SB and signalling information or, respectively, procedure control information psi and user prompting information (for example, for displays in a display means) is formed thereat. Further, a display means AZE is connected to the local bus LB as already set forth.

The communication terminal equipment is connected to a subscriber line ASL via a connector unit or mode adaptor AE. The connector unit AE is connected to a power supply SV that provides positive and negative voltages, +U and −U. The communication terminal equipment KE communicates with a communications system KA via this subscriber line ASL. The messages covering 64 k byte/s and the signalling information covering 8 k byte/s are bidirectionally communicated via the subscriber line ASL. The signalling information communicated in the signalling channel is structured according to the OSI reference model. Of the seven abstracted protocol layers of the OSI reference model, the lower three protocol layers are realized. The signalling information communicated in the connector unit AE via the subscriber line ASL is edited in conformity with the local bus and is communicated to the microprocessor system μP via the local bus LB. This signalling information is further-processed in the microprocessor system μP according to the signalling procedure implemented therein in program-oriented terms and the corresponding reactions individually associated to communication terminal equipment are initialized. The message information separated in the connector unit AE proceeds via a corresponding connection BK to an analog-to-digital converter means A/D. Analog voice signals are formed therein from the digitized message or, respectively, voice signals output by the connector unit AE. The analog voice signals incoming at a further input of the analog-to-digital converter means A/D are converted into digital voice signals. The analog voice signals proceed via a corresponding connection to a third input E3 of an acoustics means AKE. The acoustics means AKE is composed of an acoustic coupler AK and of a control means ASE. The acoustic coupler AK switches the analog signals incoming from the analog-to-digital converter means either only to a first output A1 or to the first and second outputs A1, A2. Output A1 is connected to the handset HA of the communication terminal equipment KE via a pre-amplifier VV. In all cases, the analog voice signals are conducted to an earphone in the handset HA via the pre-amplifier VV after through-connection of the call. Analogously thereto, the voice signals output from the microphone in the handset HA proceed via the pre-amplifier VV to a first input E1 of the acoustic coupler AK. The analog voice signals are switched by the acoustic coupler AK to a third output A3 connected to the analog-to-digital converter means A/D. These analog voice signals are converted into digital signals in the analog-to-digital converter means A/D and, in the connector unit AE, are inserted into the message stream to be communicated to the subscriber line ASL. When the performance feature of "open listening" is activated in the communication terminal equipment KE on the basis of, for example, a corresponding key event, then the analog voice signals incoming at the third input E3 are simultaneously conducted to a second output A2 of the acoustic coupler AK. From the latter, the analog voice signals proceed via an amplifier V to a loudspeaker LS arranged in the communications terminal equipment. The control means ASE arranged in the acoustics means AKE is connected both to the acoustic coupler AK as well as to the local bus LB. In this drive means ASE, the control commands communicated by the microprocessor system μP via the local bus LB are converted into information with which the connecting circuits and the acoustic coupler AK are set. For example, the acoustic coupler AK is realized by analog crosspoints executed in CMOS technology. In addition, the control means ASE controls a ringing tone generator RT that produces different ringing tones with corresponding ringing rhythms depending upon the drive. These ringing tones are communicated to the handset HA and/or to the loudspeaker LS via the acoustic coupler AK and input EV under the control of the control means ASE.

Figure 3B:
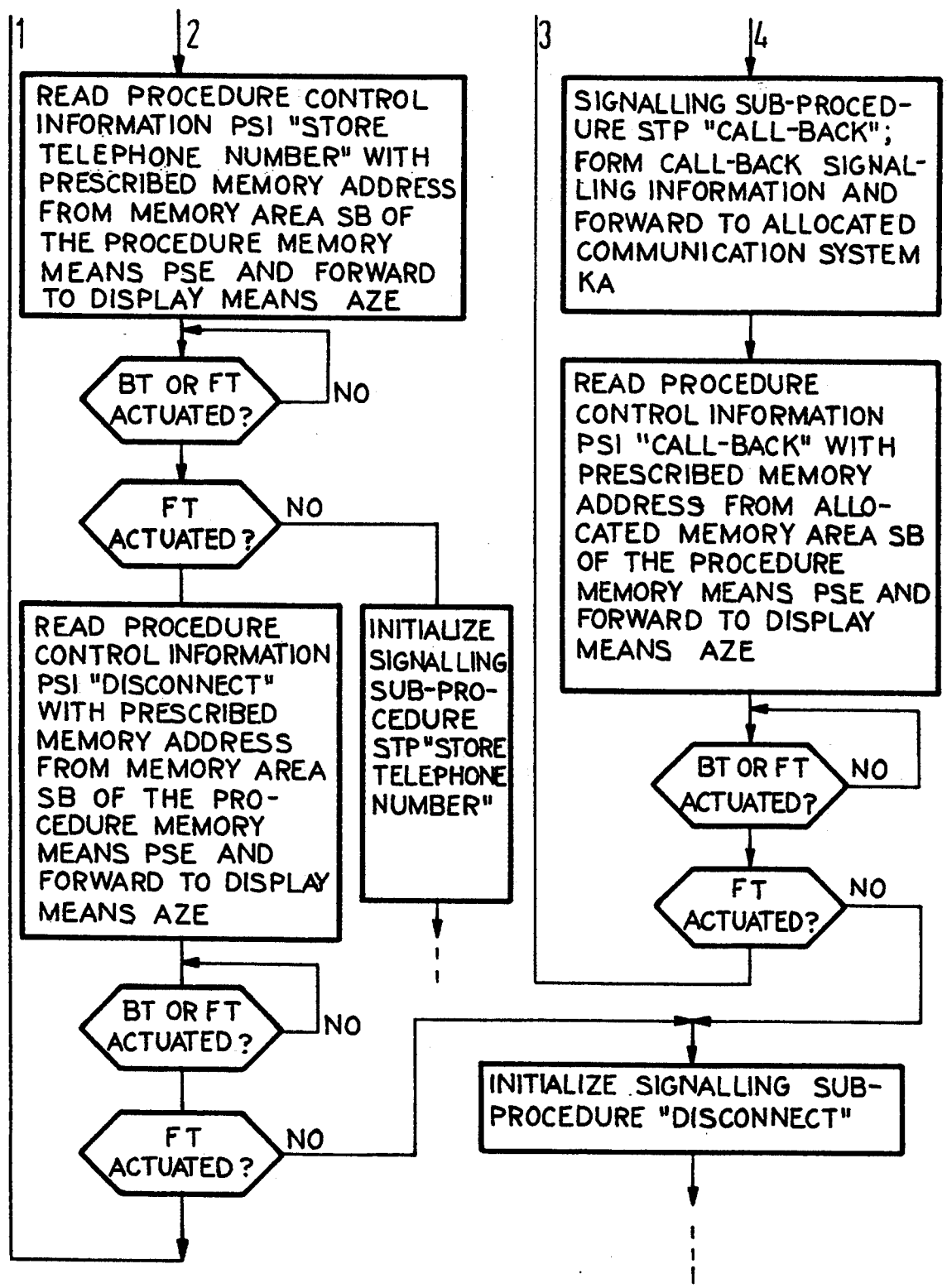

An essentially self-explanatory flowchart of a section of the signalling procedure SP is shown in FIGS. 3a and 3b. After the start of the signalling procedure SP by activating a communication terminal equipment 'A', for example, the audio-active means HSE is picked up, let it be assumed for the exemplary embodiment that the "select communication terminal equipment B" signalling sub-procedure is ended. Let it also be assumed that the communication terminal equipment 'B' is not activated, i e. a connection to subscriber 'B' cannot be setup. At this point, a branching of the signalling procedure into signalling sub-procedures STP of "callback", "store telephone number" or "disconnect" is possible. It has been found on the basis of empirical measurements that the "callback" signalling sub-procedure STP is used most frequently in this branching, the "store telephone number" signalling sub-procedure STP is used with the second greatest frequency and the "disconnect" signalling sub-procedure STP is used least. Consequently, the procedure control information psi "callback?" is first formed by reading this information from the procedure memory means PSE and is communicated to the display means AZE. Dependent on the actuation of the actuation key BT or of the sequence key FT, the "callback" signalling sub-procedure STP is initialized and the following branching of the signalling procedure SP is selected or a further procedure control information psi, "store telephone number", is in turn formed by reading this information from the procedure memory means PSE and is transmitted to the display means AZE. After actuation of the sequence key FT and dependent on a renewed actuation of the actuation key BT or of the sequence key FT, either the signalling sub-procedure STP of "store telephone number" is initialized and the following branching of the signalling procedure SP is selected or a further procedure control information psi of "disconnect" is formed by reading this procedure control information psi from the procedure memory means PSE and is communicated to the display means AZE. After a further actuation of the sequence key FT and again dependent on the actuation of the actuation key BT or of the sequence key FT, either the signalling sub-procedure STP of "disconnect" is initialized and the following branching of the signalling procedure SP is selected or the procedure control information psi of "callback?" is again formed and is communicated to the display means AZE. The formation of procedure control information psi shown in FIGS. 3a and 3b, as well as, the further branching of the signalling procedure SP into the signalling sub-procedures STP dependent on the actuation of the actuation key BT and of the sequence key FT is shown representatively for all branchings within the signalling procedure SP. Only the plurality and type of signalling sub-procedures STP differ at the other branchings of the signalling procedure SP.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for controlling a signalling procedure in a communication terminal equipment, a call setup or call clearing between the communication terminal equipment and a communication system connected thereto, as well as, performance feature controls within a framework of the call setup and call clearing and during a communication phase being controlled by the signalling procedure realized in program-oriented terms and controlled by key actuations, comprising the steps of:
   providing signalling sub-procedures definable by different procedure control information, said signalling sub-procedures forming the signalling procedure;
   forming first procedure control information that defines a signalling sub-procedure after every activation of the communication terminal equipment and before every branching of the signalling procedure into a plurality of signalling sub-procedures and communicating said first procedure control information to a display device for displaying at least the first procedure control information;
   activating a sequence key in the communication terminal equipment, and in response thereto forming further procedure control information defining a further signalling sub-procedure and communicating the further procedure control information to the display device; and
   activating an actuation key in the communication terminal equipment, and in response thereto selecting and executing a signalling sub-procedure respectively defined by procedure control information most recently supplied to the display device.

2. The method according to claim 1, wherein the first procedure control information and a sequence of further procedure control information is formed dependent on a frequency of use of each of the respective signalling sub-procedures.

3. The method according to claim 1, wherein each of the procedure control information comprise prescribed program elements.

4. The method according to claim 1, wherein each of the procedure control information is stored in prescribed memory areas of a procedure memory allocated to the signalling procedure; and wherein memory addresses; by means of which the memory areas containing each of the procedure control information are respectively read and by means of which procedure control information that have been read is communicated to the display device, are indicated in the signalling procedure before every branching.

5. The method according to claim 4, wherein each of the procedure control information is communicated to the communication terminal equipment from the communications system with a transmission procedure and is stored in the prescribed memory areas of the procedure memory.

6. The method according to claim 4, wherein groups of procedure control information representing different successions of frequencies of use of signalling sub-procedures are stored in the communications system; wherein, upon initialization of the communication terminal equipment, a prescribed group of procedure control information is communicated from the communications system to the respective communication terminal equipment; wherein a different group of procedure control information is selectable by a signalling initialized in the communication terminal equipment and acting vis-a-vis the communications system; and wherein the selected group is transmitted to the respective communication terminal equipment with a transmission procedure and is stored thereat in the prescribed memory areas of the procedure memory.

7. The method according to claim 6, wherein the groups of procedure control information are stored in different, prescribed memory areas of the procedure memory of the communications terminal equipment; wherein the different memory areas are selected at the communication terminal equipment, whereby the selection is effected by different memory address calculations.

8. The method according to claim 1, wherein the first procedure control information and at least one further procedure control information is formed before every branching of the signalling procedure into a plurality of signalling sub-procedures and is communicated to the display device for displaying at least one of the first procedure control information and the further procedure control information.

9. A method for controlling a signalling procedure in a communication terminal equipment, a call setup or call clearing between the communication terminal equipment and a communications system connected thereto, as well as, performance feature controls within a framework of the call setup and call clearing and during a communication phase being controlled by the signalling procedure realized in program-oriented terms and controlled by key actuations, comprising the steps of:
   providing signalling sub-procedures definable by different procedure control information, said signalling sub-procedures forming the signalling procedure;
   forming first procedure control information that defines a signalling sub-procedure and storing the first procedure control information is prescribed memory areas of a procedure memory after every activation of the communication terminal equipment and before every branching of the signalling procedure into a plurality of signalling sub-procedures and communicating only said first procedure control information to a display device for displaying at least the first procedure control information, and memory addresses, by means of which the memory areas containing the first procedure control information is respectively read and by means of which the first procedure control information that has been read is communicated to the display device, being indicated in the signalling procedure before every branching;

activating a sequence key in the communication terminal equipment, and in response thereto forming further procedure control information defining a further signalling sub-procedure and communicating only the further procedure control information to the display device; and activating an actuation key in the communication terminal equipment, and in response thereto selecting and executing a signalling sub-procedure respectively defined by procedure control information most recently supplied to the display device.

10. The method according to claim 9, wherein the first procedure control information and a sequence of further procedure control information is formed dependent on a frequency of use of each of the respective signalling sub-procedures.

11. The method according to claim 9, wherein each of the procedure control information is communicated to the communication terminal equipment from the communications system with a transmission procedure and is stored in the prescribed memory areas of the procedure memory.

12. The method according to claim 9, wherein groups of procedure control information representing different successions of frequencies of use of signalling procedure information are stored in the communications system; wherein, upon initialization of the communication terminal equipment, a prescribed group of procedure control information is communicated from the communications system to the respective communication terminal equipment; wherein a different group of procedure control information is selectable by a signalling initialized in the communication terminal equipment and acting vis-a-vis the communications system; and wherein the selected group is transmitted to the respective communication terminal equipment with a transmission procedure and is stored thereat in the prescribed memory areas of the procedure memory.

13. The method according to claim 12, wherein the groups of procedure control information are stored in different, prescribed memory areas of the procedure memory of the communications terminal equipment; wherein the different memory areas are selected at the communication terminal equipment, whereby the selection is effected by different memory address calculations.

14. The method according to claim 9, wherein the first procedure control information and at least one further procedure control information is formed before every branching of the signalling procedure into a plurality of signalling sub-procedures and is communicated to the display device for displaying at least one of the first procedure control information and the further procedure control information.

15. A method for controlling a signalling procedure in a communication terminal equipment, a call setup or call clearing between the communication terminal equipment and a communications system connected thereto, as well as, performance feature controls within a framework of the call setup and call clearing and during a communication phase being controlled by the signalling procedure realized in program-oriented terms and controlled by key actuations, comprising the steps of:

providing signalling sub-procedures definable by different procedure control information, said signalling sub-procedures forming the signalling procedure;

storing groups of procedure control information representing different successions frequencies of use of signalling procedure information in the communications system;

upon initialization of the communication terminal equipment, communicating a prescribed group of procedure control information from the communications system to the respective communication terminal equipment;

selecting a group of procedure control information by a signalling initialized in the communication terminal equipment and acting vis-a-vis the communications system;

transmitting the selected group to the respective communication terminal equipment with a transmission procedure and storing thereat in prescribed memory areas of a procedure memory;

forming at least a first procedure control information from the selected group that defines a signalling sub-procedure and storing the first procedure control information in the prescribed memory areas of the memory after every activation of the communication terminal equipment and before every branching of the signalling procedure into a plurality of signalling sub-procedures and communicating said first procedure control information to a display device for displaying at least the first procedure control information, and memory addresses, by means of which the memory areas containing the first procedure control information is respectively read and by means of which the first procedure control information that has been read is communicated to the display device, being indicated in the signalling procedure before every branching;

activating a sequence key in the communication terminal equipment, and in response thereto forming further procedure control information defining a further signalling sub-procedure and communicating the further procedure control information to the display device; and activating an actuation key in the communication terminal equipment, and in response thereto selecting and executing a signalling sub-procedure respectively defined by procedure control information most recently supplied to the display device.

16. The method according to claim 15, wherein the groups of procedure control information are stored in different, prescribed memory areas of the procedure memory of the communications terminal equipment; wherein the different memory areas are selected at the communication terminal equipment, whereby the selection is effected by different memory address calculations.

17. The method according to claim 15, wherein the first procedure control information and at least one further procedure control information is formed before every branching of the signalling procedure into a plurality of signalling sub-procedures and is communicated to the display device for displaying at least one of the first procedure control information and the further procedure control information.

18. The method according to claim 15, wherein the first procedure control information and a sequence of further procedure control information is formed dependent on a frequency of use of each of the respective signalling sub-procedures.

* * * * *